(12) United States Patent
Yoshikawa et al.

(10) Patent No.: US 11,200,287 B2
(45) Date of Patent: Dec. 14, 2021

(54) GLOBAL ADDRESS LIST

(75) Inventors: Chad Owen Yoshikawa, Kirkland, WA (US); George Benjamin Michael van den Driessche, London (GB); Mark Stephen Goodman, Seattle, WA (US); Philip Charles Nelson, San Jose, CA (US); Mark Edward Stahl, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 1086 days.

(21) Appl. No.: 13/593,457

(22) Filed: Aug. 23, 2012

(65) Prior Publication Data

US 2015/0207899 A1    Jul. 23, 2015

Related U.S. Application Data

(60) Provisional application No. 61/542,066, filed on Sep. 30, 2011.

(51) Int. Cl.
*G06F 16/00* (2019.01)
*G06F 16/9535* (2019.01)
*H04L 29/08* (2006.01)
*H04L 29/06* (2006.01)

(52) U.S. Cl.
CPC ...... *G06F 16/9535* (2019.01); *H04L 67/1095* (2013.01); *H04L 67/306* (2013.01); *H04L 69/28* (2013.01)

(58) Field of Classification Search
CPC ............. G06F 16/9535; G06F 16/9537; G06F 16/955; G06Q 10/10; G06Q 30/01; H04L 51/28; H04L 67/1095; H04L 67/306; H04L 69/28

USPC .................................................. 707/600–899
See application file for complete search history.

(56) References Cited

U.S. PATENT DOCUMENTS

| 6,999,968 | B1 * | 2/2006 | Parkin | G06F 17/30498 |
| 7,415,486 | B2 | 8/2008 | Multer | |
| 7,587,446 | B1 * | 9/2009 | Onyon | G06Q 10/10 |
| | | | | 707/999.01 |
| 8,533,258 | B2 * | 9/2013 | Parker, III | G06Q 30/01 |
| | | | | 707/612 |
| 2004/0078393 | A1 * | 4/2004 | Acree | G06F 16/27 |

(Continued)

OTHER PUBLICATIONS

C. Daboo, "vCard Extensions To WebDAV (CardDAV)," Network Working Group, Internet-Draft, Oct. 16, 2005.

*Primary Examiner* — Michelle N Owyang
(74) *Attorney, Agent, or Firm* — Lowenstein Sandler LLP (57) ABSTRACT

Configurations for providing a data feed of contact information updates, deletes, and additions to one or more clients are disclosed. A contact information server can maintain a log including respective log entries of different updates (e.g., in a log structure data store) performed on the contact information. The contact information server orders the log entries using associated timestamps in order to be consistent with the actual order of updates performed on the contact information. For synchronizing contact information, a client will submit a query and supply a timestamp to the contact information server to request the log of updates based on the timestamp (e.g., log entries corresponding to a set of updates since the included timestamp). The server will respond with one or more modifications to the contact information represented as the set of updates in respective log entries.

20 Claims, 6 Drawing Sheets

(56) References Cited

U.S. PATENT DOCUMENTS

| | | | |
|---|---|---|---|
| 2005/0033596 A1* | 2/2005 | Tummolo | G06Q 30/02 |
| | | | 705/1.1 |
| 2005/0114312 A1* | 5/2005 | Mosescu | G06F 3/0237 |
| 2006/0052091 A1* | 3/2006 | Onyon | H04L 67/306 |
| | | | 455/415 |
| 2007/0185938 A1* | 8/2007 | Prahlad | G06F 17/30212 |
| 2008/0147750 A1* | 6/2008 | Zondervan | G06F 16/275 |
| 2008/0205655 A1* | 8/2008 | Wilkins | G06Q 10/10 |
| | | | 380/279 |
| 2008/0263103 A1* | 10/2008 | McGregor et al. | 707/200 |
| 2009/0157732 A1 | 6/2009 | Hao et al. | |
| 2009/0216725 A1* | 8/2009 | Yaqub | G06Q 10/107 |
| 2009/0222493 A1* | 9/2009 | Smarr | G06F 17/30575 |
| 2009/0276430 A1* | 11/2009 | Bruso | G06F 17/30362 |
| 2011/0055382 A1* | 3/2011 | Narasimhan | H04L 41/046 |
| | | | 709/224 |
| 2012/0209808 A1* | 8/2012 | Tien | H04W 4/90 |
| | | | 707/622 |
| 2012/0284450 A1* | 11/2012 | Huang | G06F 12/0246 |
| | | | 711/103 |

* cited by examiner

GLOBAL ADDRESS LIST

CROSS-REFERENCE TO RELATED APPLICATIONS

The present application claims the benefit of priority under 35 U.S.C. § 119 from U.S. Provisional Patent Application Ser. No. 61/542,066 entitled "GLOBAL ADDRESS LIST," filed on Sep. 30, 2011, the disclosure of which is hereby incorporated by reference in its entirety for all purposes.

BACKGROUND

In an e-mail application, contact information for one or more contacts can be stored. Changes to the contact information (e.g., due to changes in an organization) can make a local version of the contact information be outdated.

SUMMARY

The subject technology provides for synchronizing contact information for one or more contacts over a network. A request is received over the network from a client for a set of updates performed on contact information of the one or more contacts. The request includes a timestamp associated with a previous synchronization time by the client. The subject technology determines the set of updates among one or more log entries based on the included timestamp from the request. Each log entry includes a respective update performed on contact information of the one or more contacts. The subject technology then transmits the set of updates over the network to the client.

The subject technology further provides for periodically synchronizing contact information on a client. The subject technology determines a timestamp associated with a previous synchronization of contact information. A request is then transmitted for a set of updates performed on the contact information based on the timestamp associated with the previous synchronization of the contact information. The subject technology receives the set of updates performed on the contact information. The set of updates is then performed on the contact information.

Yet another aspect of the subject technology provides a system for synchronizing contact information for one or more contacts over a network. The system includes memory, one or more processors and one or more modules stored in memory and configured for execution by the one or more processors. The system includes a logging module configured to generate one or more log entries for one or more updates performed on contact information of the one or more contacts. The system further includes a synchronization module configured to receive a request for contact information over the network from a client, to determine among the one or more log entries a set of updates performed on the contact information, and to transmit the set of updates over the network to the client.

The subject technology further provides for receiving a request over the network from a client for a set of updates performed on contact information of the one or more contacts. The request includes a timestamp associated with a previous synchronization time by the client. The subject technology determines the set of updates among one or more log entries based on the included timestamp from the request. Each log entry includes a respective update performed on contact information of the one or more contacts and the set of updates is temporally ordered according to a respective timestamp associated with each update of the set of updates. Additionally, the set of updates is transmitted over the network to the client in which transmitting the set of updates is throttled to include a subset of the set of updates.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

For a given e-mail application or electronic messaging application running on a particular client (e.g., Gmail, Outlook, mobile device e-mail, etc.), contact information of employees/members of an organization/company in a particular domain can require frequent updating in order to synchronize locally stored contact information (e.g., profile information in an address book or contacts list) with contact information stored remotely by a contact information server (e.g., in the cloud). Although the aforementioned example mentions contact information for an e-mail application, other contact information (e.g., social networking contact(s), Short Message Service contact(s), instant messaging contact(s), other communications service contact(s), etc.) in different types of electronic messaging applications or communication services can be provided and still be within the scope of the subject technology. In particular, additions, deletions and other updates to a company's employees and staff can change respective contact information stored by the contact information server. As a result, locally stored contact information can be out of sync with the modified contact information remotely stored in the cloud (e.g., stored in a remote data store). The aforementioned frequent synchronization of contact information therefore can consume computing and networking resources for the client running the electronic messaging application. Thus, minimizing the communication/synchronization overhead with the cloud (e.g., the contact information server) for synchronizing the locally stored contact information is desirable.

To address the aforementioned issue(s), the subject technology provides a data feed of contact information updates, deletes and additions to one or more clients. As used herein, the updates, deletes and additions to contact information can be collectively referred to as a set of updates. Contact information can include profile information of a user (e.g., user information for a social networking platform or service). The contact information server in one example keeps a log including respective log entries of different updates (e.g., in a log structure data store) performed on the contact information. The contact information server orders the log entries using associated timestamps in order to be consistent with the actual order of updates performed on the contact information. For synchronizing contact information, a client will submit a query and supply a timestamp to the contact information server to request the log of updates based on the timestamp (e.g., log entries corresponding to a set of updates since the included timestamp). The server will respond with one or more modifications to the contact information represented as the set of updates in respective log entries. The server can throttle a transmission of the set of updates to the client by including a subset of the updates and a corresponding timestamp to the last update in the subset (e.g., so that the client can subsequently request the remaining updates from the timestamp). The client can then use the returned modifications from the server to update the locally stored contact information (e.g., by performing the set of updates on the locally stored contact information).

Additionally, to enable searching of the contact information, the contact information server can utilize an index of prefixes in order to cache string data associated with the contact information. For example, the index of prefixes can speed up search queries from the client by storing the prefixes for data included in the contact information such as display name (e.g., first name and last name) e-mail address, etc. Thus, by utilizing the index of prefixes, a search query does not require an exhaustive search of all contact information and the search query can be processed in a more efficient manner.

Figure 1:
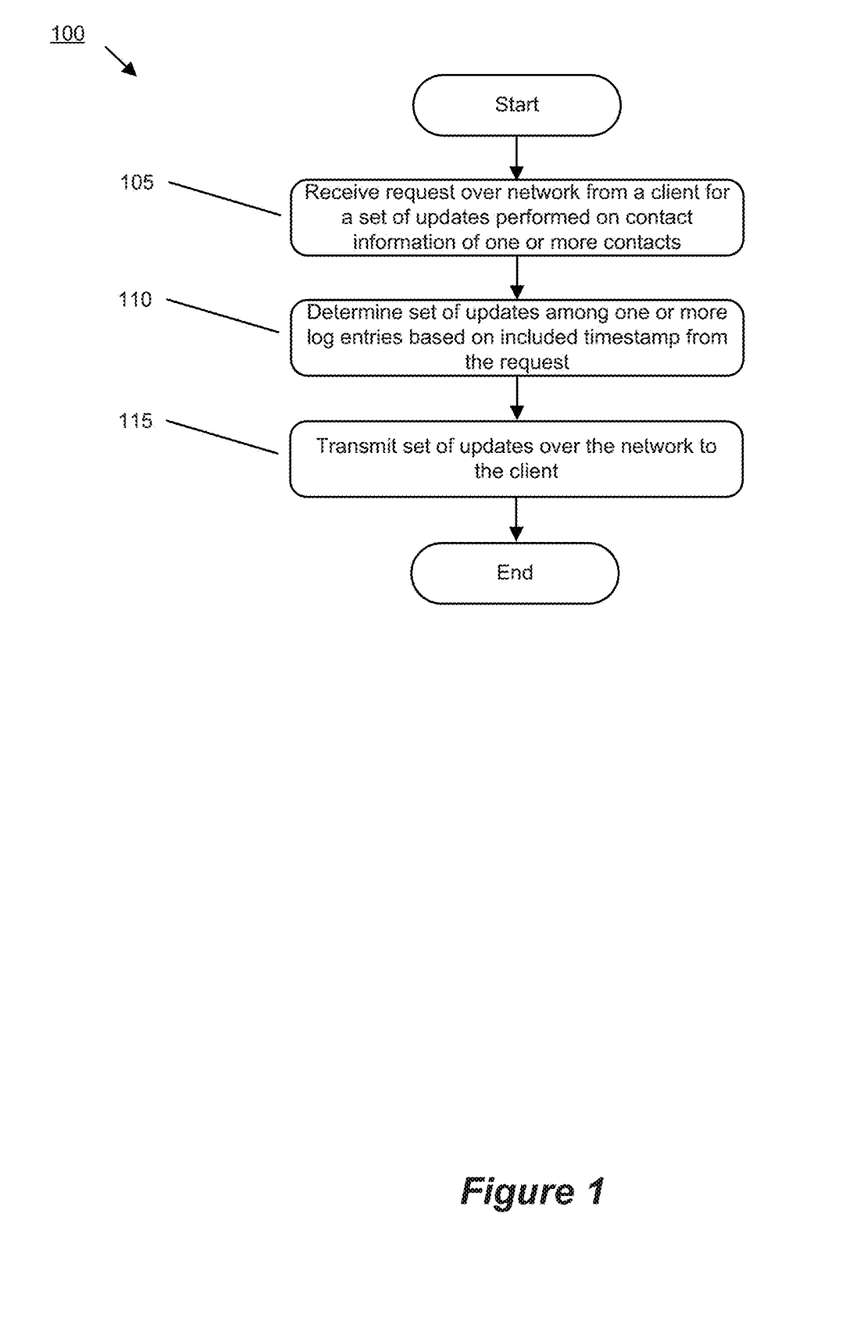
FIG. 1 conceptually illustrates an example process for synchronizing contact information for one or more contacts over a network FIG. 2 conceptually illustrates an example process for periodically synchronizing contact information on a client.

FIG. 1 conceptually illustrates an example process 100 for synchronizing contact information for one or more contacts over a network. The network can include, but is not limited to, a local network, remote network, or an interconnected network of networks (e.g., Internet). The process 100 can be performed in response to a request from a client to synchronize contact information. The process 100 can be implemented by a contact information server in one example that transmits updated contact information to the client.

The process 100 begins at 105 by receiving a request over a network from a client for a set of updates performed on contact information of one or more contacts. The request can include a timestamp associated with a previous synchronization time by the client. The set of updates includes one of a deletion, addition or update operation performed on the contact information in some configurations. The contact information can include profile information of the one or more contacts. For example, the profile information of a contact can include information such as a display name (e.g., first name, last name, etc.), the contact's e-mail address, office address, one or more phone numbers, etc. Further, the contact information can include information associated with or pertaining to a social networking profile. The contact information can include other types of information and still be within the scope of the subject technology.

The process 100 at 110 determines the set of updates among one or more log entries based on the included timestamp from the request. Each log entry can include a respective update (e.g., addition, deletion, update, etc.) performed on contact information of the one or more contacts. The contact information can be stored in one or more data centers, locations, and/or domains in one example. The set of updates is temporally ordered according to a respective timestamp associated with each update of the set of updates in one example. For instance, the temporally ordered set of updates is in ascending or descending order according to each respective timestamp. The set of updates therefore can include one or more log entries.

At 115, the process 100 transmits the set of updates over the network to the client. In an example in which a size of data for the set of updates could saturate network bandwidth and/or computing resources, the process 100 can throttle the transmission of the set of updates to include a subset of the set of updates. The process 100 can then receive a second request (or more) for a set of remaining update from the set of updates. In this manner, the process 100 can transmit the set of updates in more manageable data chunks. The process 100 then ends.

Although the example in FIG. 1 describes that a timestamp is included with the request at 105 and 110, in another example the request may not include a timestamp. In this case, the process 100 can determine or retrieve all contact information for one or more contacts. In other words, the process 100 can assume that no prior synchronization of contact information has occurred and therefore all contact information should be transmitted to the client.

Figure 2:
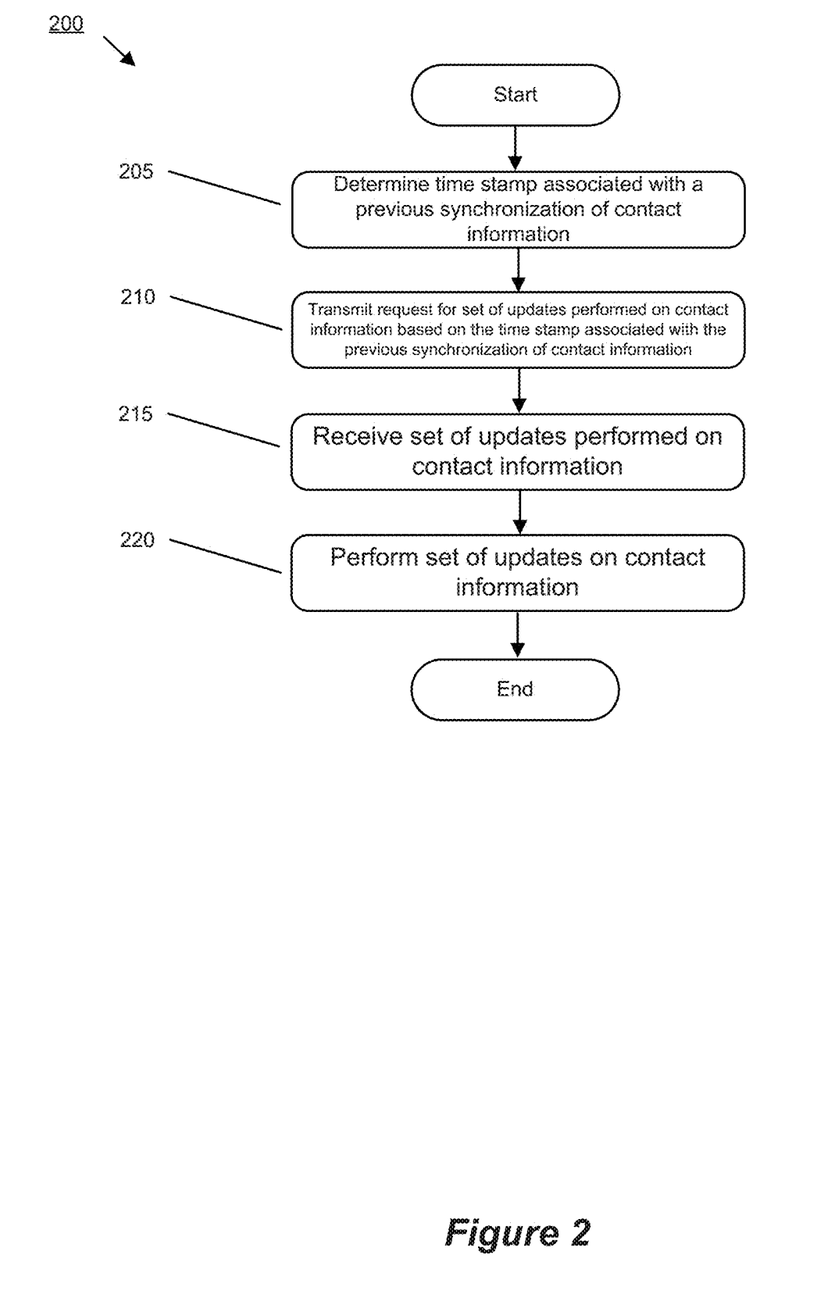

FIG. 2 conceptually illustrates an example process 200 for periodically synchronizing contact information on a client. More specifically, the process 200 can be implemented by a client (e.g., an e-mail application) to update contact information of one or more contacts over a network. The process 200 can be performed on a periodic basis based on a predetermined time interval between synchronization requests. Alternatively or conjunctively, the process 200 can be performed in response to a manual request from a user to synchronize contact information.

The process 200 starts at 205 by determining a timestamp associated with a previous synchronization of contact information. Contact information can include profile information of one or more contacts. By way of example, each time a request is transmitted for synchronizing contact information, a timestamp can be recorded or stored to indicate the time of the request. Thus, the process 200 can determine the previous synchronization of contact information based on the timestamp. If no timestamp is determined, the process 200 can assume that no prior synchronization has been previously performed.

The process 200 at 210 transmits a request for a set of updates performed on contact information based on the timestamp associated with the previous synchronization of contact information. In one example, the process 200 includes the timestamp that indicates the previous synchronization time in the transmitted request. A plug-in executing within an e-mail client transmits the request for the set of updates in some configurations. Other types of electronic messaging applications (e.g., instant messaging, social network messaging, SMS, etc.) can transmit the request for the set of updates and still be within the scope of the subject technology.

At 215, the process 200 receives the set of updates performed on contact information. The process 200 can receive the set of updates from the contact information server over the network. The process 200 continues to 220 to perform the set of updates on the contact information. Performing the set of updates on contact information occurs on locally stored contact information in one example. The set of updates includes one of a deletion, addition or update operation performed on the contact information in some configurations. In one example, the set of updates are ordered in ascending chronological order based on a respective timestamp so that the process 200 can sequentially perform each update from the set of updates. By sequentially performing the set of updates, the process 200 can more likely ensure the integrity of the contact information so that any changes are accurately reflected on a locally stored version of the contact information. The process 200 then ends.

As discussed above, to enable searching of the contact information, the contact information server can utilize an index of prefixes in order to cache string data associated with the contact information. For example, the index of prefixes can speed up search queries from the client by storing the prefixes for data included in the contact information such as display name (e.g., first name and last name), e-mail address, etc. Thus, by utilizing the index of prefixes, a search query does not require an exhaustive search of all contact information and the search query can be processed in a more efficient manner.

Figure 3:
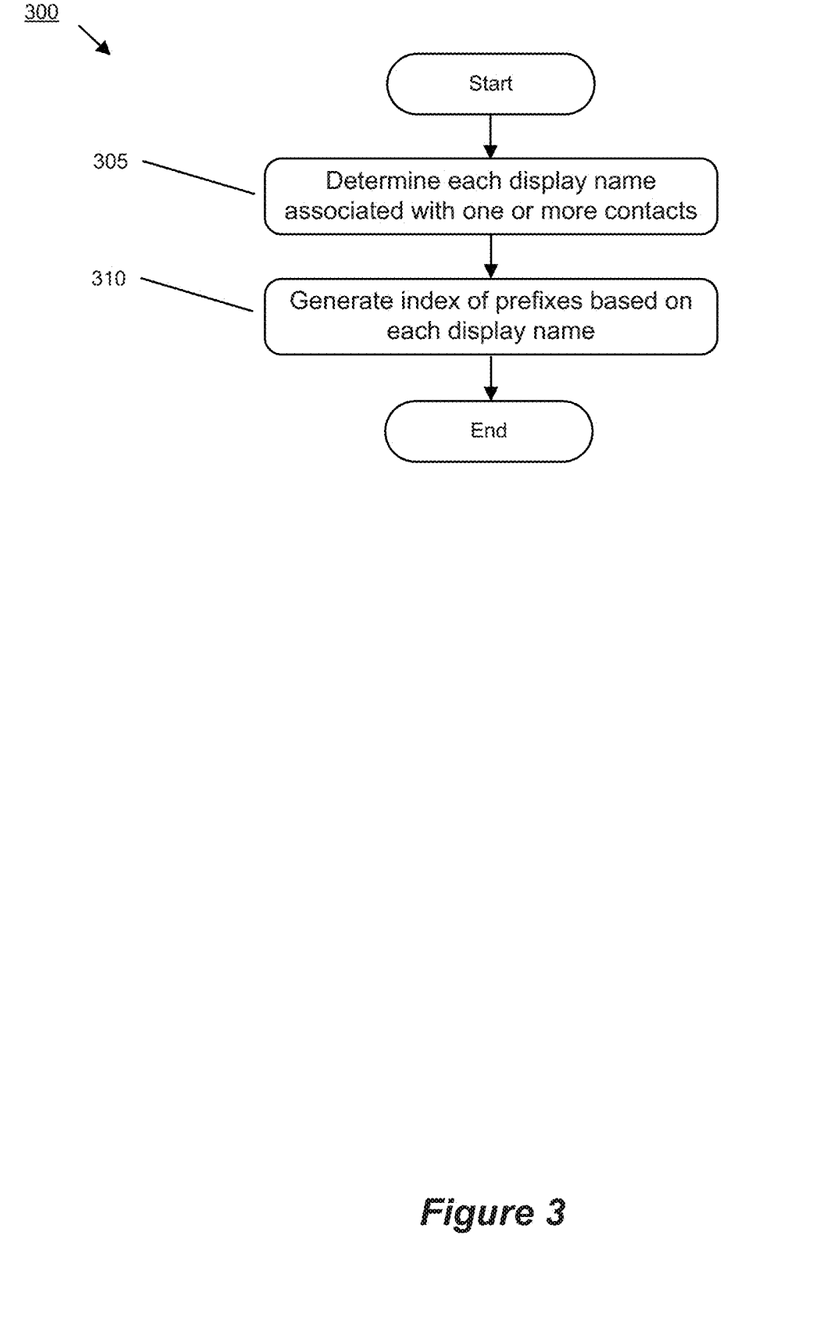
FIG. 3 conceptually illustrates an example process for optimizing a search for contact information.

FIG. 3 conceptually illustrates an example process 300 for optimizing a search for contact information. The process 300 can be performed on a periodic basis in order to build an index of prefixes based on contact information.

The process 300 begins at 305 by determining each display name associated with one or more contacts. For instance, each display name can include a first name, middle name and/or last name. The process 300 at 310 then generates an index of prefixes based on each display name. The process 300 can generate the index of prefixes on a periodic basis in some configurations. By way of example, the index of prefixes includes a subset of characters from each display name as a respective entry in the index of prefixes. The process 300 then ends.

Based on the generated index of prefixes, the process 300 can perform a search query for contact information in addition to the operations described above. For instance, the process 300 can receive a search query for contact information. The process 300 can then perform the search query on the index of prefixes. The process 300 then transmits contact information associated with one or more contacts based on results of the search query. By searching the index of prefixes, the process 300 avoids performing an exhaustive search for display name in which all contact information is searched. Consequently, the process 300 can return results from the search query in a quicker manner when compared to an exhaustive (e.g., brute-force) search.

Figure 4:
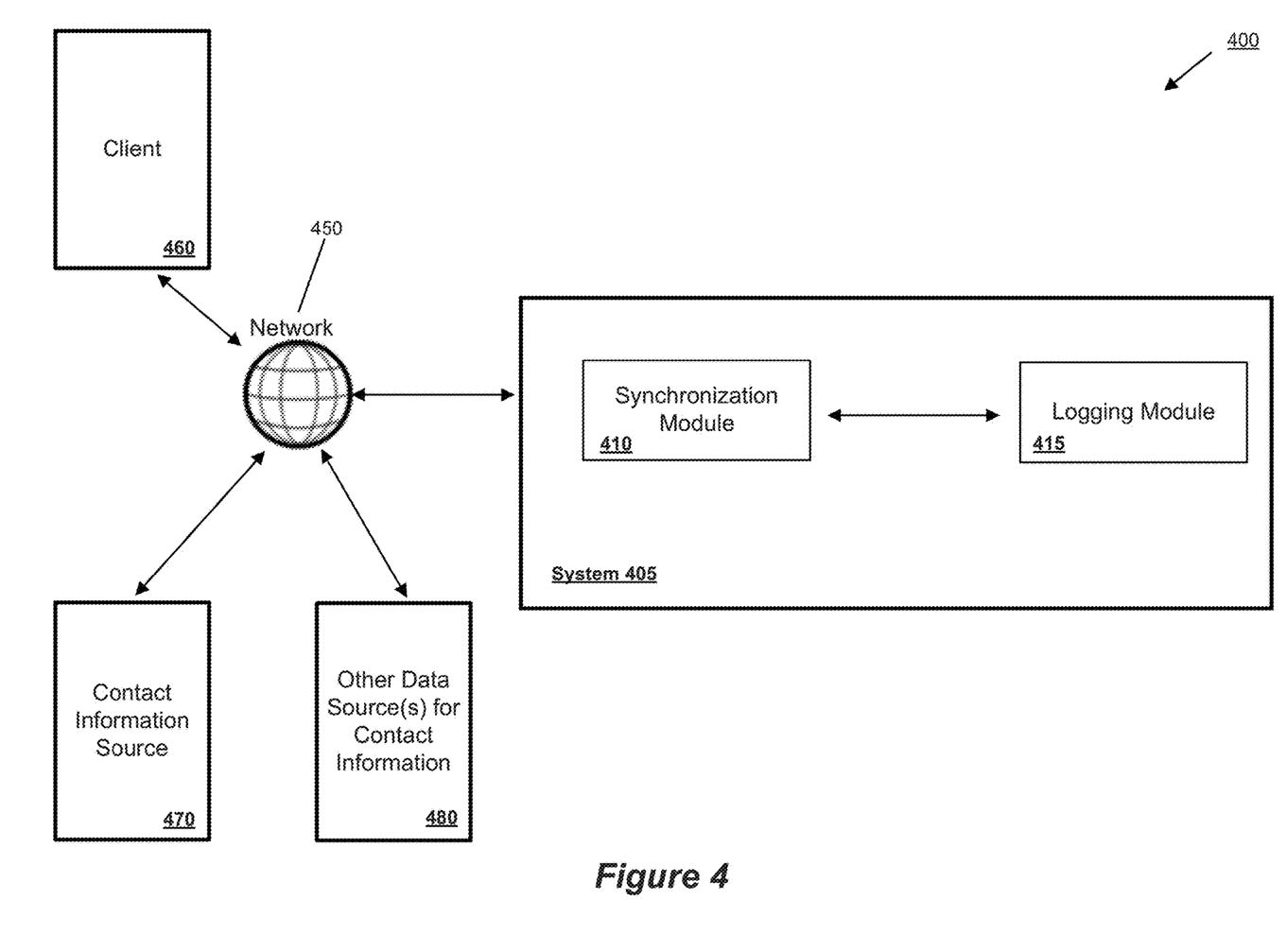
FIG. 4 conceptually illustrates an example computing environment.

FIG. 4 conceptually illustrates an example computing environment 400 including a system. In particular, FIG. 4 shows a system 405 for implementing the above described processes in FIGS. 1 and 3. In some configurations, the system 405 is part of an implementation running a particular machine (e.g., a server).

As shown in FIG. 4, the system 405 includes several modules for providing different functionality. The system 405 is configured to include a logging module 415 and a synchronization module 410. The logging module 415 is configured to generate one or more log entries for one or more updates performed on contact information of the one or more contacts. By way of example, the logging module 415 of the system 405 can communicate with a contact information source 470 and/or other data source(s) for contact information 480 to generate the one or more log entries. Each log entry includes a respective update (e.g., addition, deletion or update) performed on contact information of the one or more contacts. Although each contact information source is illustrated in FIG. 4 as being located over the network 460, the system 405 can also communicate with locally stored contact information to determine the one or more log entries for one or more updates performed on the contact information.

The synchronization module 410 is configured to receive a request for contact information over the network from a client (e.g., client 460), to determine among the one or more log entries a set of updates performed on the contact information, and to transmit the set of updates over the network to the client. In one example, the request includes a timestamp associated with a previous synchronization time by the client. The synchronization module determines the set of updates among the one or more log entries based on the included timestamp from the request in some configurations.

As further shown in FIG. 4, each of the aforementioned modules can be configured to communicate between each other. For instance, different data, messages, API calls and returns can be passed between the different modules in the system 405.

The system 405 can communicate over a network 450 with a client 460. The client 460 can each be configured to communicate with the aforementioned modules of the system 405. For instance, the client 460 can transmit a request for synchronizing contact information over the network 450 to the system 405. The system 405 can then transmit the aforementioned set of updates over the network 450 to the client 460.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 5:
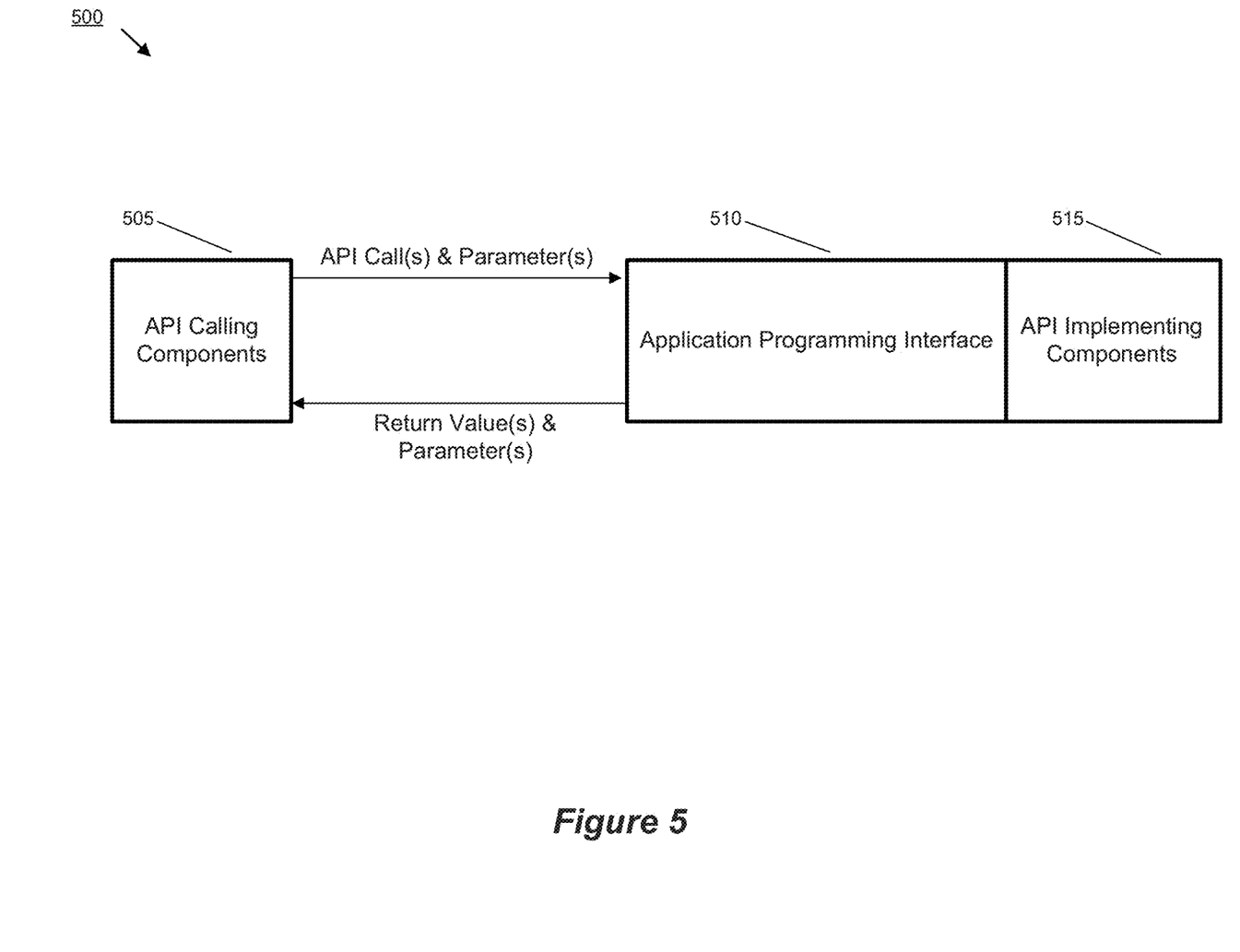
FIG. 5 conceptually illustrates an example application programming interface (API) architecture.

FIG. 5 is a block diagram illustrating an example API architecture, which can be used in some configurations of the subject technology. As shown in FIG. 5, the API architecture 500 includes the API implementing component 514 (e.g., an operating system, a library, a device driver, an API, an application program, software or other module) that implements the API 510. The API 510 specifies one or more functions, methods, classes, objects, protocols, data structures, formats and/or other features of the API-implementing component that can be used by the API-calling component 504. The API 510 can specify at least one calling convention that specifies how a function in the API implementing component receives parameters from the API calling component and how the function returns a result to the API calling component. The API calling component 504 (e.g., an operating system, a library, a device driver, an API, an application program, software or other module), makes API calls through the API 510 to access and use the features of the API implementing component 514 that are specified by the API 510. The API implementing component 514 can return a value through the API 510 to the API calling component 504 in response to an API call.

It will be appreciated that the API implementing component 514 can include additional functions, methods, classes, data structures, and/or other features that are not specified through the API 510 and are not available to the API calling component 504. It should be understood that the API calling component 504 can be on the same system as the API implementing component 514 or can be located remotely and accesses the API implementing component 514 using the API 510 over a network. While FIG. 5 illustrates a single API calling component 504 interacting with the API 510, it should be understood that other API calling components, which can be written in different languages (or the same language) than the API calling component 504, can use the API 510.

The API implementing component 514, the API 510, and the API calling component 504 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description provides a detailed description of an example mobile device architecture in which a social networking application can execute.

The following description describes an example system in which aspects of the subject technology can be implemented.

Figure 6:
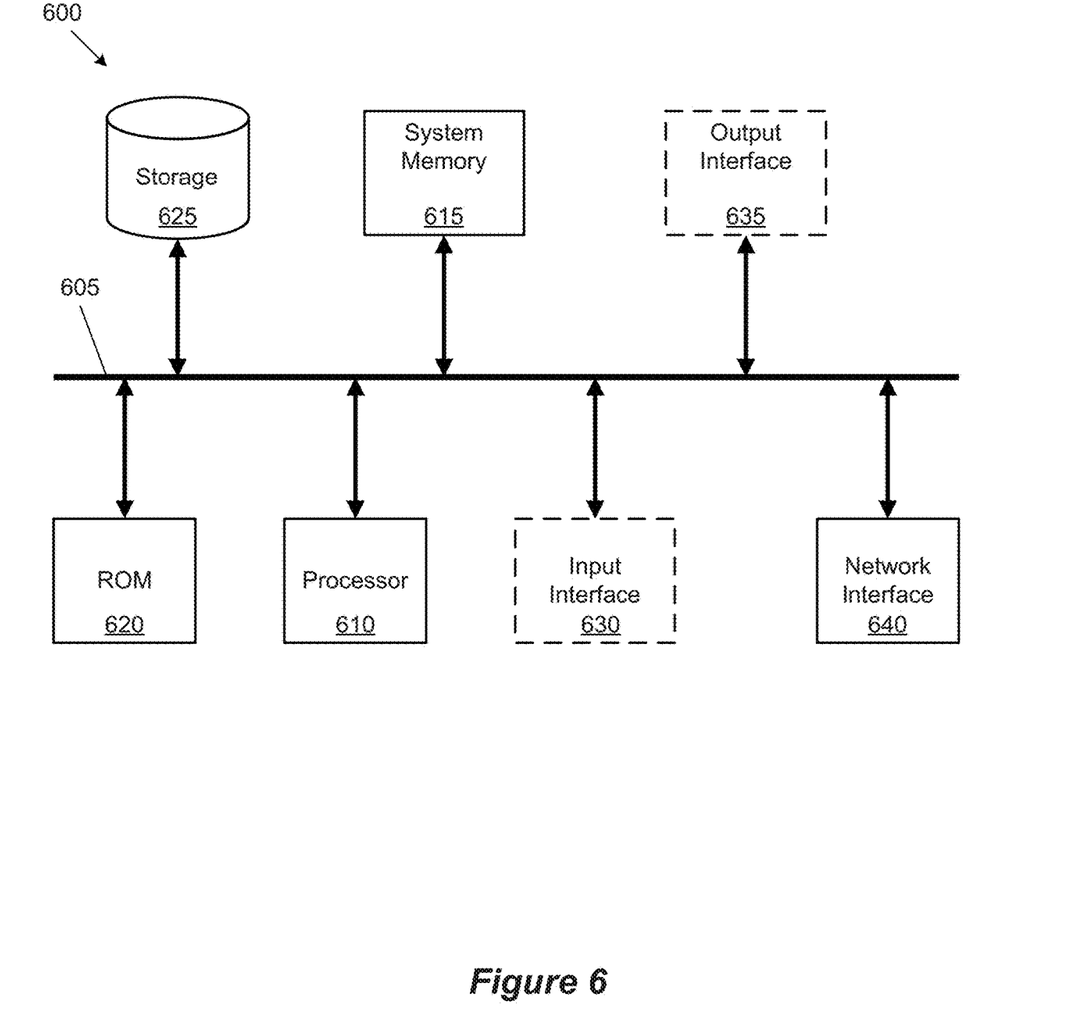
FIG. 6 conceptually illustrates a system with which some implementations of the subject technology may be implemented.

FIG. 6 conceptually illustrates a system 600 with which some implementations of the subject technology can be implemented. The system 600 can be a computer, phone, PDA, or any other sort of electronic device. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the subject technology use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the subject technology's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. Any or all components of system 600 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method comprising:
   receiving, at a server device from a client device over a network, a request for a set of updates for existing contact information of a contact of one or more contacts, wherein the request comprises a synchronization timestamp associated with a previous synchronization time of the client device;
   analyzing, based on the synchronization timestamp associated with the previous synchronization time of the client device, a log comprising one or more log entries, wherein the log is distinct from the one or more contacts, wherein a log entry of the log indicates a modification to the contact with the existing contact information, and wherein the log entry comprises additional contact information added to the existing contact information of the contact and a modification timestamp associated with a time of the modification;
   determining, by a processing device, based on the analysis of the log, the set of updates based on the one or more log entries and the synchronization timestamp, wherein the set of updates comprises the additional contact information of the contact and is absent the existing contact information of the contact; and
   transmitting the set of updates comprising the additional contact information of the log entry and the modification timestamp of the log entry over the network to the client device.

2. The method of claim 1, wherein the set of updates is based on a deletion, an addition, and an update operation performed on the one or more contacts.

3. The method of claim 1, wherein the set of updates is temporally ordered according to the respective modification timestamp associated with each update of the set of updates.

4. The method of claim 3, wherein the temporally ordered set of updates is in ascending order according to each respective modification timestamp.

5. The method of claim 3, wherein the temporally ordered set of updates are in descending order according to each respective modification timestamp.

6. The method of claim 1, wherein the additional contact information of the contact comprises profile information of a user.

7. The method of claim 6, wherein the profile information pertains to a social networking service, an email service, or a phone service.

8. The method of claim 1, wherein transmitting the set of updates comprises throttling the transmission of the set of updates to include a subset of the set of updates.

9. The method of claim 8, further comprising:
   receiving a second request for a set of remaining updates from the set of updates, the second request including a timestamp corresponding to a last update in the subset of the set of updates; and
   transmitting the set of remaining updates, the set of remaining updates determined based on the timestamp corresponding to the last update in the subset of the set of updates.

10. The method of claim 1, wherein the set of updates further comprises data of a plurality of the log entries.

11. The method of claim 1, wherein the one or more contacts are stored in one or more data centers.

12. The method of claim 1, wherein the one or more contacts is stored in one or more domains.

13. The method of claim 1, further comprising:
    determining a display name associated with the one or more contacts; and
    generating an index of prefixes based on the display name.

14. The method of claim 13, further comprising:
    receiving a search query from the client device for contact information;
    performing the search query on the index of prefixes; and
    transmitting, to the client device, contact information associated with one or more contacts based on results of the search query.

15. The method of claim 13, wherein the index of prefixes is generated on a periodic basis.

16. The method of claim 13, wherein the index of prefixes includes a subset of characters from each display name as a respective entry in the index of prefixes.

17. A system comprising:
    a memory;
    one or more processors coupled to the memory, the one or more processors to:
        receive a request for existing contact information over a network from a client, wherein the request comprises a synchronization timestamp associated with a previous synchronization time;
        analyze, based on the synchronization timestamp associated with the previous synchronization time, a log comprising one or more log entries, wherein the log is distinct from the one or more contacts, wherein a log entry of the log indicates a modification to a contact with the existing contact information, and wherein the log entry comprises additional contact information added to the existing contact information of the contact and a modification timestamp associated with a time of the modification;

determine among the one or more log entries, based on the analysis of the log, a set of updates performed on the existing contact information, wherein the set of updates comprises the additional contact information and is absent the existing contact information of the contact; and transmit the set of updates comprising the additional contact information of the log entry and the modification timestamp of the log entry over the network to the client.

18. The system of claim 17, wherein each of the one or more log entries includes a respective update performed on contact information of the one or more contacts.

19. A machine-readable medium comprising instructions stored therein, which when executed by a machine, cause the machine to perform operations comprising:

receiving a request for a set of updates for existing contact information of a contact of one or more contacts, wherein the request is received over a network from a client device and comprises a synchronization timestamp associated with a previous synchronization time of the client device;

analyzing, based on the synchronization timestamp associated with the previous synchronization time of the client device, a log comprising one or more log entries, wherein the log is distinct from the one or more contacts, wherein a log entry of the log indicates a modification to the contact with the existing contact information, and wherein the log entry comprises additional contact information added to the existing contact information of the contact and a modification timestamp associated with a time of the modification;

determining, based on the analysis of the log, the set of updates based on the one or more log entries and the synchronization timestamp, wherein the set of updates comprises the additional contact information of the contact and is absent the existing contact information of the contact; and transmitting the set of updates comprising the additional contact information of the log entry and the modification timestamp of the log entry over the network to the client device.

20. A machine-readable medium comprising instructions stored therein, which when executed by a machine, cause the machine to:

receive a request for a set of updates for existing contact information of a contact of one or more contacts, wherein the request is received over a network from a client and comprises a synchronization timestamp associated with a previous synchronization time of the client;

analyze, based on the synchronization timestamp associated with the previous synchronization time of the client, a log comprising one or more log entries, wherein the log is distinct from the one or more contacts, wherein a log entry of the log indicates a modification to the contact with the existing contact information, and wherein the log entry comprises additional contact information added to the existing contact information of the contact and a modification timestamp associated with a time of the modification;

determine, based on the analysis of the log, the set of updates based on the one or more log entries and the synchronization timestamp, wherein the set of updates comprises the additional contact information of the contact and is absent the existing contact information of the contact;

store the set of updates comprising the additional contact information of the log entry and the modification timestamp of the log entry;

determine display names associated with the one or more contacts;

generate an index of prefixes based on the display names;

receive a search query for contact information from the client;

perform the search query on the index of prefixes; and transmit to the client a portion of the set of updates based on results of the search query.

* * * * *